Sept. 2, 1947.                J. L. KWASH                2,426,696
                         CHICK FEED CONTAINER
                         Filed Jan. 31, 1947
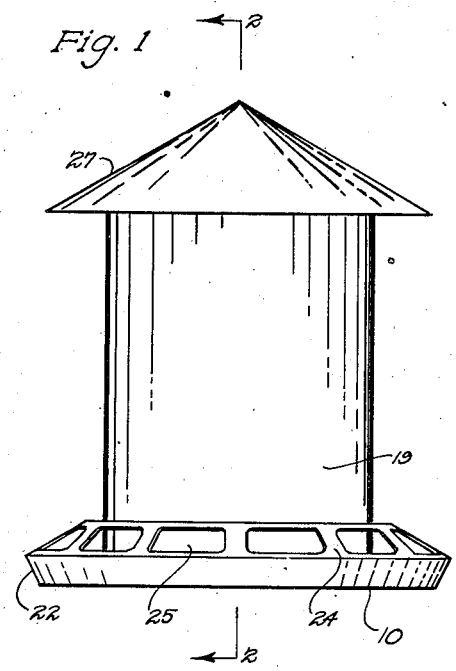
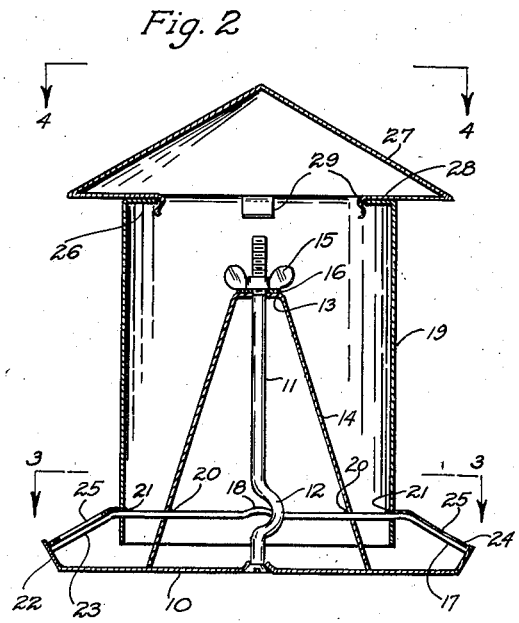
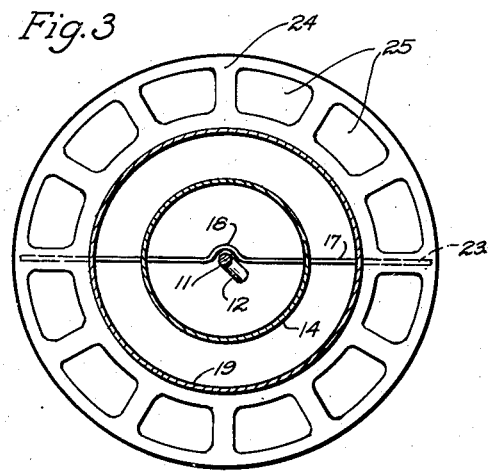
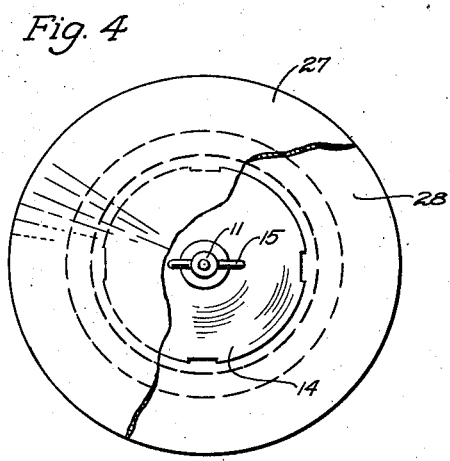
INVENTOR.
John L. Kwash
BY Victor J. Evans & Co.
ATTORNEYS Patented Sept. 2, 1947

2,426,696

UNITED STATES PATENT OFFICE 2,426,696

CHICK FEED CONTAINER

John L. Kwash, Biteley, Mich.

Application January 31, 1947, Serial No. 725,693

4 Claims. (Cl. 119—52)

This invention relates to poultry feeders.

It is an object of the present invention to provide a poultry feeder which can be easily assembled and disassembled for the purpose of being cleaned and for the purpose of adding a new supply of food to the same.

It is another object of the present invention to provide a poultry feeder which has a minimum number of parts, which is of durable construction, easily assembled and efficient in operation.

For other objects and for a better understanding of the invention reference may be had to the following detailed description taken in connection with the accompanying drawing, in which Fig. 1 is an elevational view of the feeder embodying the features of the present invention.

Fig. 2 is a cross-sectional view, taken on line 2—2 of Fig. 1 and looking in the direction of the arrows thereof.

Fig. 3 is a transverse cross-sectional view taken on line 3—3 of Fig. 2 and looking in the direction of the arrows thereof.

Fig. 4 is a top plan view taken along line 4—4 of Fig. 2 and looking in the direction of the arrows thereof and with a portion of the top broken away to show the interior of the feeder.

Referring now to the figures, 10 represents a bottom or base having attached thereto at its center, an upstanding screw bolt 11 with an offset portion 12. The upper end of the bolt 11 is threaded and is adapted to receive the flattened top 13 of a cone 14 adapted to rest upon the bottom or base 10 when in place thereon. A wing nut 15 with a washer 16 thereunder will fix this cone 14 to the bottom or base 10.

Extending through the cone 14 is a transverse bar 17 having an offset portion 18 matching with the offset portion 12 of the upstanding screw bolt 11. By having these offset portions, there is little interference when assembling or disassembling the parts of the feeder.

This bar 17 extends through the side of the cone 14 and has at points removed therefrom a cylinder wall 19 connected to it. This cylinder wall serves as the exterior of the feeder and contains the feed which is to be dispensed downwardly to the bottom or base 10. The bar is welded to the cone as indicated at 20 and to the cylinder wall as indicated at 21. By means of this welding there is little opportunity for the cylinder wall and the cone 14 to be displaced from one another. Feed is disposed within the cylinder 19 and passes downwardly along its interior surface and along the exterior surface of the cone 14 automatically as the feed is extracted by the chickens from the base or bottom 10.

The bar 17 further extends beyond the exterior of the cylinder wall 19 for engagement with the upper end of an upstanding peripheral flange 22 on the bottom or base 10. This flange is inclined outwardly as well as upwardly and the ends of the bar 17 are inclined downwardly as indicated at 23 and toward the flange 22.

A feed ring 24 having openings 25 therein through which access can be had to the feed, can be slid down over the cylinder wall and rested upon the top of the flange 22 and upon the projection 23 of the bar 17. The top of the cylinder wall 19 is inturned as indicated at 26. A conical shaped top 27 having an inturned base portion 28 with depending spring lugs 29 thereon is fitted to the top of the cylinder and secured to the inner periphery of the inturned flange 26 thereof. There are four of these lugs 29 which will fit over the edge of the flange 26. It will be noted that the top of the feeder is tightly sealed so as to prevent access to the feed of any foreign matter, such as leaves or the like which may be in the air and which would have a tendency to clog the feeder. It will also be noted that the offset portions 12 and 18 of the respective bolts and bar 17 permit the easy assembly of the parts and the bar 17 will serve as a stop to prevent the bolt 11 from turning as the wing nut 15 is tightened and will hold the bolt 11 in its raised position. The offset portion 12 on the bolt 11 will prevent the easy removal of the bolt 11 from the bottom 10 so that it will not be lost.

While various changes may be made in the detailed construction, it shall be understood that such changes shall be within the spirit and scope of the present invention as defined by the appended claims.

I claim:

1. A poultry feeder comprising a bottom or base having an upstanding central screw bolt, a top container structure comprising a cone adapted to rest upon the feeder bottom and having a flattened portion at its top with a hole therein for receiving the upper end of the screw bolt, a nut engaging with the flattened portion for retaining the cone in tight engagement with the feeder bottom, a supporting bar connected to the cone and extending laterally thereof, a container wall secured to the supporting bar to be supported thereby concentrically of the cone and with its lower end retained above the feeder bottom to permit the outward passage of feed sliding downwardly between the interior of the container and the cone, and a feed ring fitted about the container and over the feeder bottom.

2. A poultry feeder comprising a bottom or base having an upstanding central screw bolt, a top container structure comprising a cone adapted to rest upon the feeder bottom and having a flattened portion at its top with a hole therein for receiving the upper end of the screw bolt, a nut engaging with the flattened portion for retaining the cone in tight engagement with the feeder bottom, a supporting bar connected to the cone and extending laterally thereof, a container wall secured to the supporting bar to be supported thereby concentrically of the cone and with its lower end retained above the feeder bottom to permit the outward passage of feed sliding downwardly between the interior of the container and the cone, and a feed ring fitted about the container and over the feeder bottom, said upstanding screw bolt having an offset portion at the elevation of the supporting bar, said supporting bar extending through the interior of the cone and having an offset portion matching with the offset portion of the upstanding bolt when the parts are assembled whereby the assembly of the parts can be effected without interference from engagement of the supporting bar with the upstanding screw bolt.

3. A poultry feeder comprising a bottom or base having an upstanding central screw bolt, a top container structure comprising a cone adapted to rest upon the feeder bottom and having a flattened portion at its top with a hole therein for receiving the upper end of the screw bolt, a nut engaging with the flattened portion for retaining the cone in tight engagement with the feeder bottom, a supporting bar connected to the cone and extending laterally thereof, a container wall secured to the supporting bar to be supported thereby concentrically of the cone and with its lower end retained above the feeder bottom to permit the outward passage of feed sliding downwardly between the interior of the container and the cone, and a feed ring fitted about the container and over the feeder bottom, said bottom having an upstanding peripheral flange, said supporting bar having portions extending through the container wall and into a location adjacent the upstanding flange of the feeder base or bottom, said feed ring being removable from the container and resting upon the upstanding flange of the feeder bottom or base and upon the projected outer end of the supporting bar.

4. A poultry feeder comprising a bottom or base having an upstanding central screw bolt, a top container structure comprising a cone adapted to rest upon the feeder bottom and having a flattened portion at its top with a hole therein for receiving the upper end of the screw bolt, a nut engaging with the flattened portion for retaining the cone in tight engagement with the feeder bottom, a supporting bar connected to the cone and extending laterally thereof, a container wall secured to the supporting bar to be supported thereby concentrically of the cone and with its lower end retained above the feeder bottom to permit the outward passage of feed sliding downwardly between the interior of the container and the cone, and a feed ring fitted about the container and over the feeder bottom, said container part having an inwardly extending flange at its top, a conical cover having an inturned base portion adapted to rest over the inturned flange of the container part, and spring projections extending down from the base portion and engaging with the inwardly extending flange of the container part.

JOHN L. KWASH.